US012458821B2

(12) United States Patent
Feenstra et al.

(10) Patent No.: US 12,458,821 B2
(45) Date of Patent: Nov. 4, 2025

(54) PROTECTION AND INSTALLATION DEVICE FOR FIRE PROTECTION SPRINKLERS

(71) Applicant: Minimax Viking Patent Management GmbH, Bad Oldesloe (DE)

(72) Inventors: Shawn J. Feenstra, Caledonia, MI (US); Gary William Pleyte, Byron Center, MI (US)

(73) Assignee: Minimax Viking Patent Management GmbH, Bad Oldesloe (DE)

(*) Notice: Subject to any disclaimer, the term of this patent is extended or adjusted under 35 U.S.C. 154(b) by 323 days.

(21) Appl. No.: 17/947,407

(22) Filed: Sep. 19, 2022

(65) Prior Publication Data

US 2023/0100701 A1 Mar. 30, 2023

Related U.S. Application Data

(60) Provisional application No. 63/247,670, filed on Sep. 23, 2021.

(51) Int. Cl.
*A62C 31/28* (2006.01)
*A62C 31/02* (2006.01)
*A62C 37/12* (2006.01)
*B05B 15/16* (2018.01)

(52) U.S. Cl.
CPC .............. *A62C 31/28* (2013.01); *A62C 31/02* (2013.01); *A62C 37/12* (2013.01); *B05B 15/16* (2018.02)

(58) Field of Classification Search
CPC ......... A62C 31/28; A62C 31/02; A62C 37/12; A62C 35/68; A62C 37/11; A62C 37/08; A62C 35/58; B05B 15/16; B05B 1/262
USPC ........................................................... 169/37
See application file for complete search history.

(56) References Cited

U.S. PATENT DOCUMENTS

| | | | |
|---|---|---|---|
| 4,176,756 | A | 12/1979 | Gellman |
| 6,487,942 | B1 | 12/2002 | Carter et al. |
| 6,669,111 | B2 | 12/2003 | Vinson et al. |
| 7,055,614 | B1 | 6/2006 | Ide |
| 7,185,567 | B2 | 3/2007 | Ide |
| 7,273,189 | B2 | 9/2007 | Ide et al. |
| 7,540,330 | B2 | 6/2009 | Orr et al. |

(Continued)

FOREIGN PATENT DOCUMENTS

| | | |
|---|---|---|
| GB | 126753 | 5/2019 |

*Primary Examiner* — Tuongminh N Pham
*Assistant Examiner* — Juan C Barrera
(74) *Attorney, Agent, or Firm* — Perkins Coie LLP

(57) ABSTRACT

A method and device for protecting and installing a fire protection sprinkler assembly having a thermally responsive trigger. The method includes shielding and torquing a fire protection sprinkler with a protective device having a torque assist feature. The protective device includes a first member and a second member opposed and spaced about a plane to define an internal void and a lateral slot for strapping about the sprinkler. The torque assist feature includes a first confronting segment of the first member and a second confronting segment of the second member. The first and second confronting segments are disposed on opposite sides of the plane and spaced apart laterally about the device axis. Each of the first and second confronting segments define an internal surface of the device that form a contact surface engagement with one arm in the pair of frame arms to transfer a torque or rotational force to the sprinkler.

21 Claims, 6 Drawing Sheets

(56) References Cited

U.S. PATENT DOCUMENTS

| | | | | |
|---|---|---|---|---|
| 7,757,967 | B1 * | 7/2010 | Yang | A62C 37/08 169/37 |
| 7,891,716 | B2 | 2/2011 | Orr et al. | |
| 7,900,852 | B2 | 3/2011 | Feenstra | |
| 8,297,663 | B2 | 10/2012 | Spears | |
| 8,662,191 | B2 | 3/2014 | Orr et al. | |
| 8,905,151 | B2 | 12/2014 | Silva, Jr. et al. | |
| 9,027,660 | B2 | 5/2015 | Oldham | |
| 9,320,929 | B2 | 4/2016 | Koiwa | |
| 9,463,343 | B2 | 10/2016 | Koiwa | |
| 9,630,039 | B2 | 4/2017 | Koiwa | |
| 10,376,724 | B2 | 8/2019 | Macomber | |
| 10,737,371 | B2 | 8/2020 | Watson et al. | |
| 10,744,527 | B2 | 8/2020 | Jackson | |
| 10,940,348 | B2 | 3/2021 | Oldham et al. | |
| 10,940,349 | B2 | 3/2021 | Schnell et al. | |
| 11,160,999 | B2 | 11/2021 | Koiwa | |
| 11,872,425 | B2 | 1/2024 | Feenstra et al. | |
| 2017/0326393 | A1 * | 11/2017 | Oldham | A62C 35/68 |
| 2019/0143163 | A1 * | 5/2019 | Schnell | A62C 31/28 169/37 |
| 2019/0175968 | A1 | 6/2019 | Pressnell | |
| 2022/0203395 | A1 | 6/2022 | Pleyte et al. | |
| 2023/0087195 | A1 | 3/2023 | Workman et al. | |
| 2023/0088036 | A1 | 3/2023 | Feenstra et al. | |
| 2023/0089748 | A1 | 3/2023 | Watson et al. | |
| 2023/0090915 | A1 | 3/2023 | Scheffers et al. | |
| 2023/0101096 | A1 | 3/2023 | Watson et al. | |

* cited by examiner

PROTECTION AND INSTALLATION DEVICE FOR FIRE PROTECTION SPRINKLERS

PRIORITY DATA & INCORPORATION BY REFERENCE

This application claims the benefit of priority to U.S. Provisional Patent Application No. 63/247,670, filed on Sep. 23, 2021, which is incorporated by reference in its entirety.

TECHNICAL FIELD

The present invention relates generally to protection devices and installation tools for fire protection sprinklers and systems. In particular, the present invention relates to a protective cover and installation device for fire protection sprinklers.

BACKGROUND ART

Fire protection sprinklers include a sprinkler frame body with an inlet connected to a pressurized supply of firefighting fluid, such as water, and some type of fluid deflection member spaced from an outlet of the frame body to distribute firefighting fluid discharged from the outlet in a defined spray distribution pattern over an area to be protected. In some fire protection sprinklers, the release of fluid discharge from the sprinkler body is controlled. For example, automatic fire protection sprinklers include a fusible or thermally responsive trigger assembly which secures a seal over an internal central orifice formed proximate the outlet of the frame body. When the temperature surrounding the automatic sprinkler is elevated to a pre-selected value indicative of a fire, the trigger assembly operates, fractures or collapses to release the seal assembly and fluid flow is initiated through the sprinkler body and out the outlet to impact the fluid deflection member. In other types of controlled sprinklers, the trigger and/or seal is operated or otherwise ejected by a mechanical, electrical or computer-controlled actuator.

The response and actuation of the sprinkler is based upon the thermally responsive trigger or actuator; and the spray pattern or distribution of the firefighting fluid is defined by the fluid deflection member configuration. Accordingly, proper sprinkler performance is a function of these operative components. In order to maintain the expected performance of the sprinkler, there is a need to protect the automatic fire protection sprinkler from unintended impact and/or damage. Known fire protection covers are shown and described in U.S. Pat. Nos. 6,669,111; 7,540,330; 7,757,967; and 7,900,852. Generally, these known protective devices are either axially disposed over the sprinkler to protect the fluid deflection member and the thermally responsive trigger. Alternatively, the protective device is strapped about the sprinkler frame between the frame body and the fluid protection member to protect the thermally responsive trigger. These known protective sprinkler covers are made from plastic and are affixed about the sprinkler to protect the sprinkler during storage, transport, handling and/or during the installation process. Once the sprinkler is properly installed in the branch connector, the protective device can be removed to place the sprinkler into service.

Fire protection sprinklers are used, for example, in the protection of storage commodities and occupancies. Storage fire protection systems include a network of pipes connected to a firefighting fluid supply and installed above the storage commodity beneath the ceiling of the occupancy. The piping network includes one or more branch lines coupled to a cross-main which is connected to a fluid supply by a vertical piping riser to supply the branch line(s) with the firefighting fluid. Fire protection sprinklers are connected to the branch lines in an appropriate orientation and at an appropriate sprinkler-to-sprinkler spacing.

To connect the fire protection sprinklers to the branch lines, the branch lines are configured as linear pipe headers with branch connectors extending from the header for receipt and threaded connection of a fire protection sprinkler. Known connectors have one inlet end configured for welded connection to the pipe header and an opposite outlet end with a tapered threaded end for connection of a sprinkler. In order to form a fluid tight seal between the threadedly engaged connector and the sprinkler, a sealing tape or putty is be applied to the sprinkler. In order to form a fluid tight seal between the cooperating tapered threads, the sprinkler must be properly torqued using a wrench.

There are also known branch connectors which eliminate either or both of the tapered thread connection or the need to apply a sealing tape or putty. For example, each of U.S. Pat. Nos. 8,297,663 and 10,744,527 and U.S. Patent Publication No. 2019/0175968 show and describe connectors or adapters for connecting a fire protection sprinkler to a pipe header. Each of these known connectors use an internal straight thread at the outlet to connect the tapered thread of the fire protection sprinkler, which allows the sprinkler to be placed in a desired rotational orientation without the interference of the thread engagement. To form a fluid tight seal between the connector and the sprinkler, each of the connectors employ an internal annular seal member. The sprinkler is then threaded into the connector and sufficiently torqued to form the fluid tight connection.

In order to maintain protection of the sprinkler during the installation process it is preferred to keep a protective device on the sprinkler. This can create a problem for properly torquing the sprinkler to form a fluid tight seal. The presence of a known protective device on the sprinkler frame can interfere or prevent proper wrench engagement. Moreover, it is problematic trying to use the known protective device to directly torque the sprinkler because these known protective devices are not configured to sufficiently grasp the sprinkler frame and transfer a torque sufficient to form a fluid tight sealed connection. Accordingly, there is a need for sprinkler protective devices that can protect operative components of the sprinkler during storage, transport handling and installation and also sufficiently transfer a torque or rotational force to form a fluid tight sealed connection between a sprinkler and a branch connector.

DISCLOSURE OF THE INVENTION

Preferred embodiments of a device and method are provided for protecting and installing an automatic fire protection sprinkler assembly having a preferred frame with a body and a pair of spaced apart frame arms in a plane and extending from the body with a fluid deflection member coupled to the frame arms and spaced from the body and a thermally responsive trigger assembly coaxially disposed between the body and the fluid deflection member. A preferred protective installation device includes a first member and a second member opposed and spaced about a plane to define an internal void having a device axis and a lateral slot aligned along the plane and in communication with the void for strapping about the pair of spaced apart frame arms of the sprinkler with the frame arms aligned along the plane with the fire protection sprinkler housed within the void. The protection and installation device includes a preferred torque assist feature for transferring a torque to the sprinkler. The torque assist feature includes a first confronting segment of the first member and a second confronting segment of the second member. The first and second confronting segments are disposed on opposite sides of the plane and spaced apart laterally about the device axis. Each of the first and second confronting segments define an internal surface of the device that form a contact surface engagement with one arm in the pair of frame arms and transfer a torque to the sprinkler that has been applied to the device.

Preferred embodiments of a protected fire protection sprinkler assembly are also provided. One preferred embodiment of a protected fire protection sprinkler assembly includes a fire protection sprinkler including a body having an inlet, an outlet, an internal passageway extending between the inlet and the outlet along a central sprinkler axis, and an external thread formed about the central sprinkler axis. The fire protection sprinkler includes a pair of frame arms extending axially from the body and converging toward one another to preferably form an apex centered along the central sprinkler axis and spaced axially from the outlet. The fire sprinkler includes a fluid deflection member preferably affixed to the apex and centered along the central sprinkler axis with the apex between the thermally responsive trigger assembly and the fluid deflection member. The preferred assembly includes a protection and installation device strapped about the fire protection sprinkler.

The preferred device includes a first protective member and a second protective member opposed one another about the plane to define a void therebetween for housing at least a part of the sprinkler therein. The opposed first and second protective members defines at least one lateral slot aligned with the plane extending parallel to the plane for passing the frame arms laterally therethrough in and out of the void. Each of the first and second protective members preferably have a confronting segment for confronting one frame arm and a shielding segment for shielding the thermally responsive trigger. The confronting segment of the first protective member and the confronting segment of the second protective member are on opposite sides of the plane confronting different frame arms so as to collectively form a torque assist feature of the device. The confronting segments form a contact surface engagement with the pair of frame arms to transfer an applied torque to the sprinkler frame.

The preferred protective device and sprinkler assembly provide for preferred methods of installing a fire protection sprinkler having a frame with a body and a pair of frame arms extending from the body and spaced apart from one another in a plane, a fluid deflection member coupled to the frame arms and spaced from the body with a thermally responsive trigger assembly coaxially disposed between the body and the fluid deflection member along a central sprinkler axis. The preferred method includes laterally receiving the fire protection sprinkler within an internal void of a protective installation device defined between a first protective member and a second protective member of the device. The preferred method also includes simultaneously applying a torque to each arm with a first confronting segment of the first protective member confronting one frame arm from one side of the plane and a second confronting segment of the second protective member confronting the other frame arm from the opposite side of the plane.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
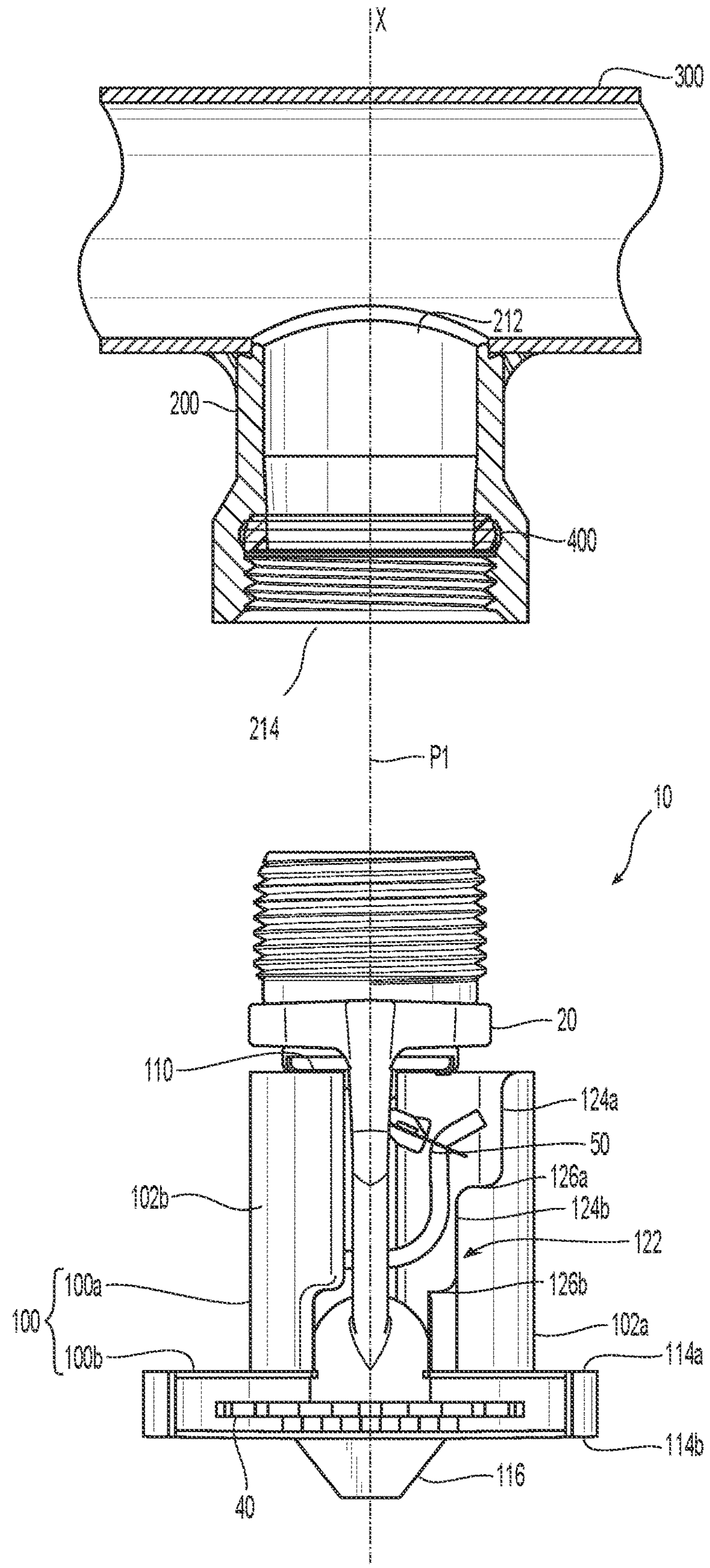
FIG. 1A is a partial cross-sectional exploded view of a preferred embodiment of a protected sprinkler assembly coupled to a branch connector.
Figure 4:
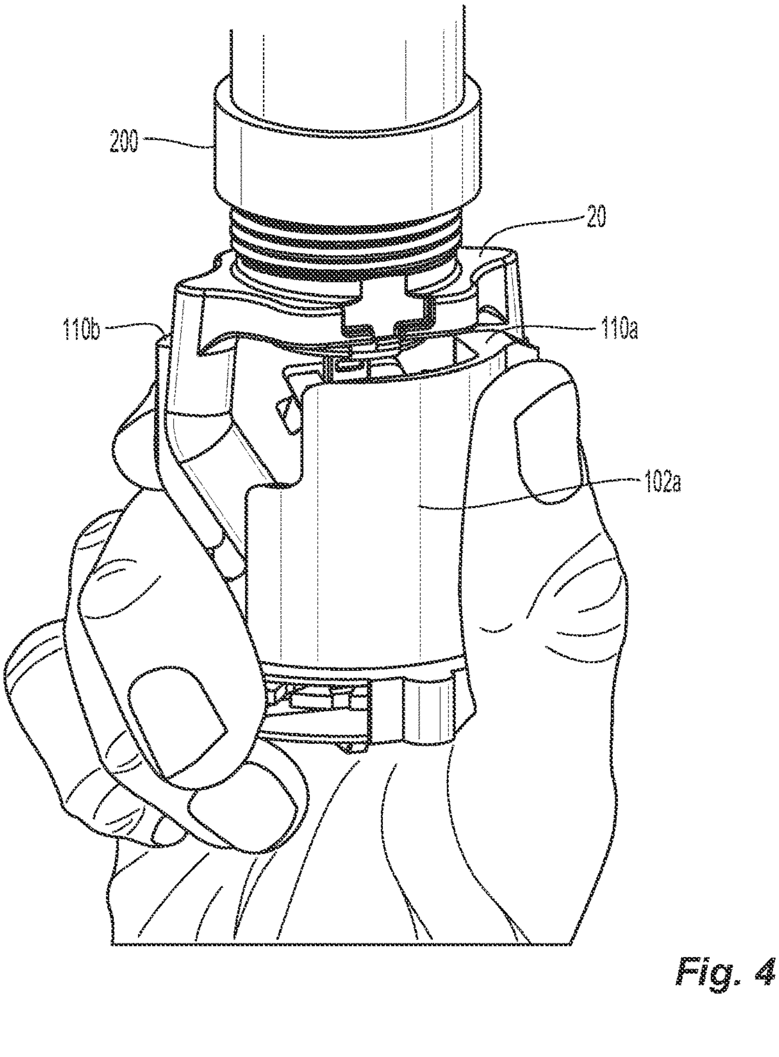
FIG. 4 is an illustration of the preferred protected sprinkler assembly in FIG. 1A being installed by hand.

Shown in FIG. 1A is an exploded partial cross-sectional view of a preferred protected sprinkler assembly 10 having a fire protection sprinkler 20 and a protective device 100 for installation in a branch connector 200 of a fluid supply pipe header 300. Preferred embodiments of the protective device 100 protects the sprinkler 20 from unintentional impact and damage during storage, transport, installation and/or when awaiting to be placed into service. Moreover, the protective device 100 also serves as a tool for installing the sprinkler 20 into the branch connector 200 of a fire protection sprinkler system. More specifically, the preferred device 100 facilitates installation of the sprinkler 20 by hand torquing the protected assembly into the branch connector 200 as illustrated in FIG. 4.

Figure 1B:
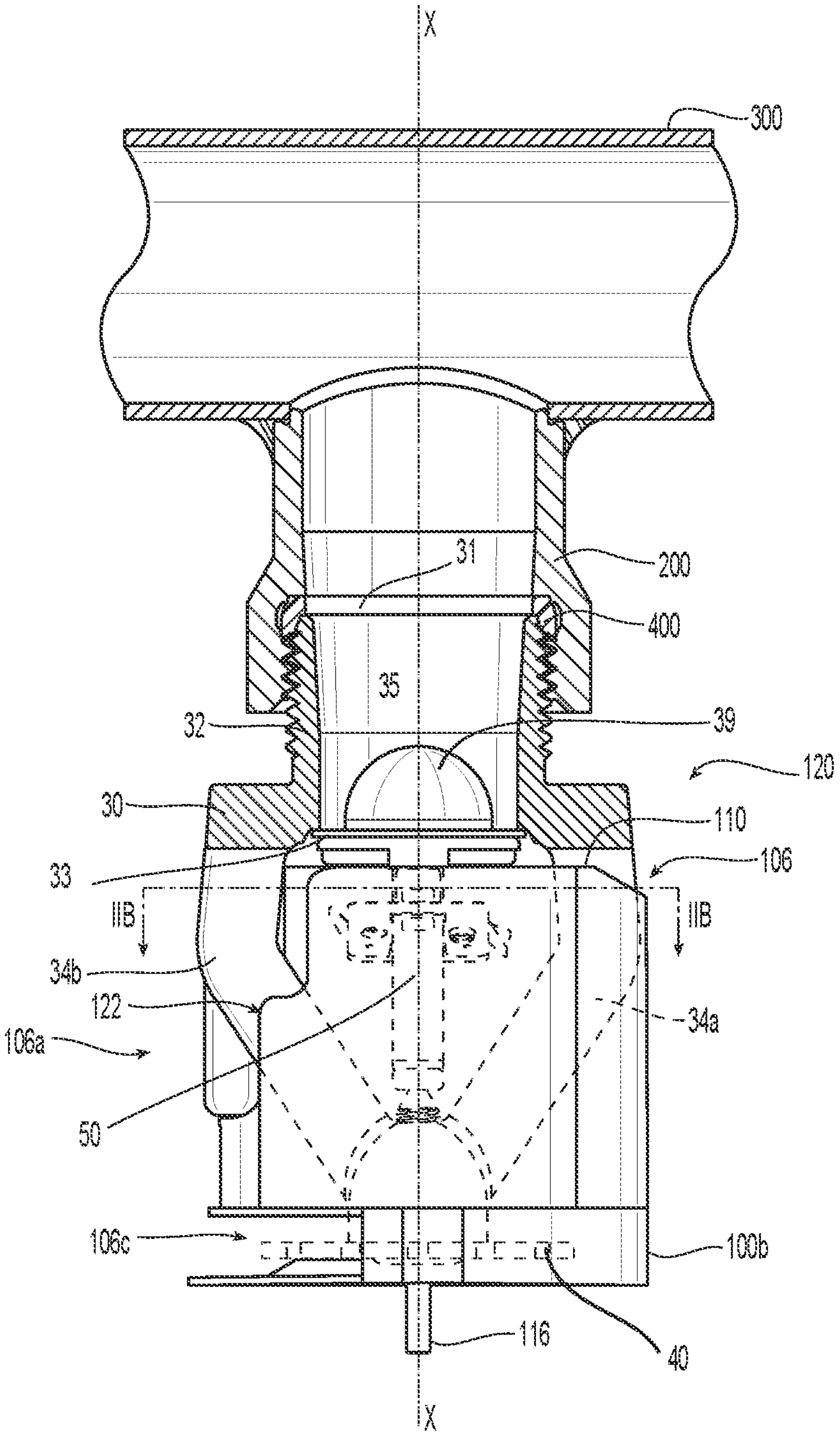
FIG. 1B is a partial cross-sectional phantom view of the protected sprinkler assembly of FIG. 1A.
Figure 2A:
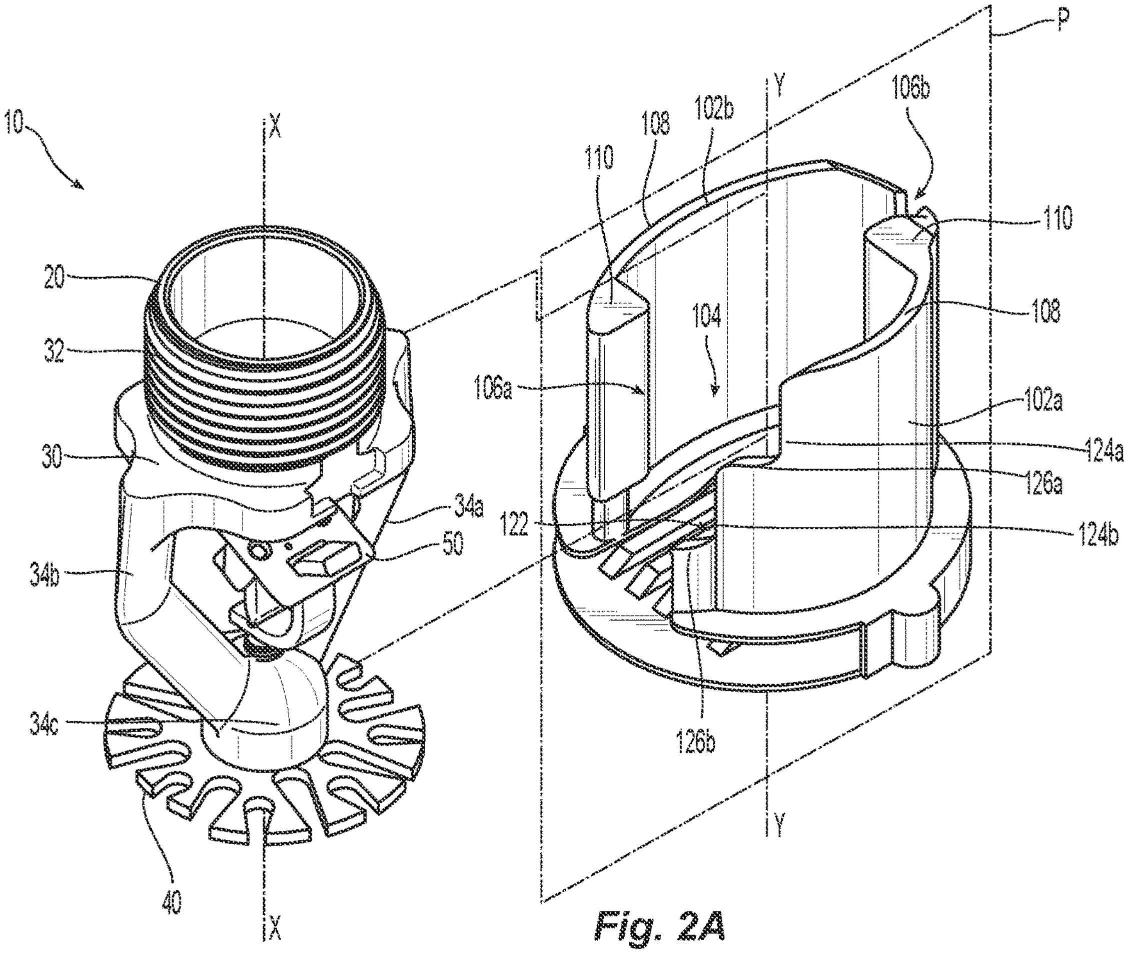
FIG. 2A is an exploded perspective view of the protected sprinkler assembly of FIG. 1A.

With reference to FIGS. 1A-1B and 2A, in preferred embodiments of the protected sprinkler assembly and its installation, the sprinkler 20 generally includes a frame 30 with a body 32 and a pair of spaced apart frame arms 34*a*, 34*b* extending from and preferably diametrically disposed about the body 32. The frame arms 34*a*, 34*b* are preferably aligned with one another in plane P. A fluid deflection member 40 is coupled to the frame arms 34*a*, 34*b* and axially spaced from the body 32. The fluid deflection member 40 and the sprinkler 20 can be configured for installation as a pendent sprinkler, as shown, or alternatively as a horizontal sprinkler or an upright sprinkler. The sprinkler body 32 has a fluid inlet 31, a fluid outlet 33, defining an internal passageway 35 extending between the inlet 31 and the outlet 33 along a central sprinkler axis X-X. The body is configured for installation in the branch connector 200; and in preferred embodiments of the sprinkler 20, the body 32 includes an external thread formed about the central sprinkler axis X-X for a preferably threaded connection to the branch connector 200.

The sprinkler 20 is preferably an automatic sprinkler with a thermally responsive trigger assembly 50 coaxially disposed between the body 32 and the fluid deflection member 40. The trigger 50 can be embodied as a frangible glass bulb or alternatively, a solder link with strut and lever assembly. The automatic fire protection sprinkler includes an internal seal assembly 39 that is supported in place by the thermally responsive trigger assembly 50 to maintain a fluid tight seal. In preferred embodiments of the sprinkler 20, the fluid deflection member 40 is affixed to an apex 34*c* coaxially aligned the central axis X-X. Alternatively, or additionally, the trigger assembly 50 and/or seal assembly 39 can incorporate an actuator for a controlled discharge. In the preferred frame 30, the frame arms 34*a*, 34*b* preferably converge to form the preferred apex 34*c*. The thermally responsive trigger assembly 50 is preferably axially supported by a threaded load screw or member 60 threaded into the apex 34*c*. Accordingly, the apex 34*c* is preferably located between the thermally responsive trigger assembly 50 and the fluid deflection member 40.

The sprinkler 20 is installed and connected to the branch connector 200 by the device 100. The protective device 100 is subsequently removed and the sprinkler 20 is placed into service. The trigger assembly 50 is configured to thermally actuate in response to a fire or sufficient level of heat. Upon thermal actuation, the seal assembly 39 is released and ejected from the outlet 33 preferably under fluid pressure delivered to the inlet 31 from the header 300 and through the branch connector 200. The firefighting fluid is discharged from the open outlet 33 for distribution by the fluid deflection member 40 to address the fire event.

Shown in FIGS. 1A-1B and 2A-2C are various views of the protected sprinkler assembly 10. In the preferred sprinkler assembly 10, the protective and installation device 100 is disposed about the fire protection sprinkler frame 30 so as to at least partially circumscribe and protect the thermally responsive trigger 50 and even more preferably partially circumscribe and protect the fluid deflection member 40. In preferred embodiments described herein, the protective device 100 includes a first portion 100*a* for protecting the thermally responsive trigger 50 and preferably a second portion 100*b* for protecting the fluid deflection member 40. Preferred embodiments of the protective installation device 100 includes torque assist features that facilitates transfer of a torque, and more preferably a hand torque, to the sprinkler 20 by minimizing or eliminating rotational slip or relative rotation between the sprinkler 20 and the device 100. Moreover, the protective device 100 includes external contact points or surfaces that facilitate grip of the device 100 to protect the sprinkler 20 and/or the user or handler.

Figure 2B:
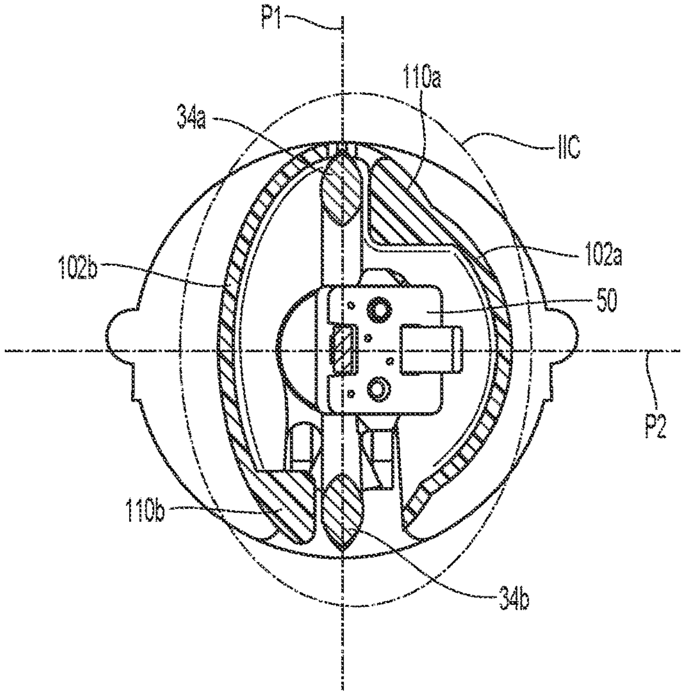
FIG. 2B is a cross-sectional plan view of the protected sprinkler assembly in FIG. 1B along line IIB-IIB.
Figure 2C:
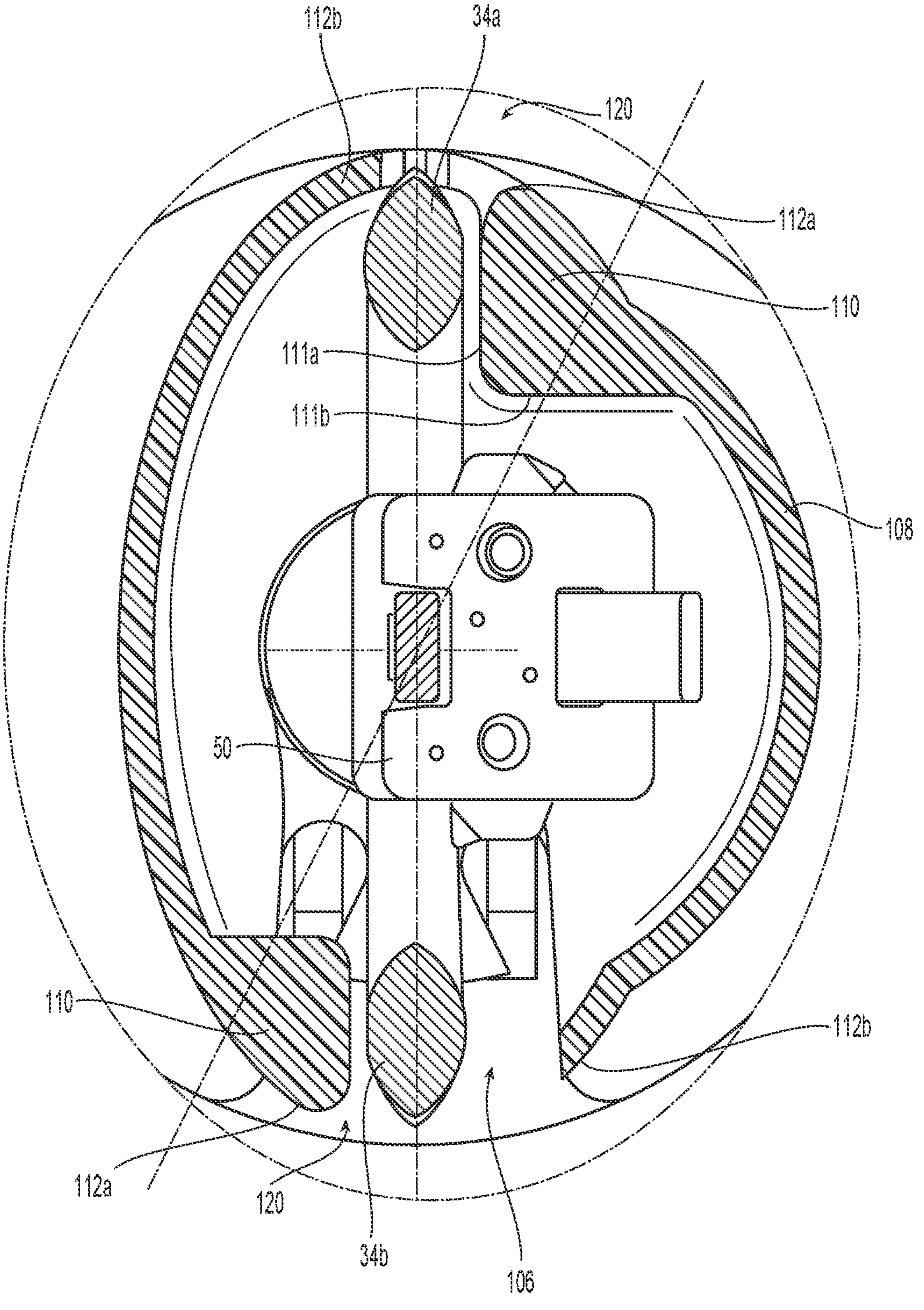
FIG. 2C is a detailed view of FIG. 2B along portion IIC.

The preferred protection and installation device 100 is preferably strapped about the sprinkler 20 so as to locate and house operative components of the sprinkler 20 within an internal protective space or void of the device 100. The protective device 100 preferably includes a first member 102*a* and a second member 102*b* spaced apart and opposed from one another about a plane P and a device axis Y-Y to define an internal space or void 104 therebetween for housing at least a part of the sprinkler 20 therein with the device preferably coaxially aligned with the sprinkler 20. The opposed first and second protective members 102*a*, 102*b* are spaced apart to define one, and preferably more than one, lateral slot 106 for alignment with the plane P. In strapping about or removing the device 100 from the sprinkler 20 in the protected assembly 10, the frame arms 34*a*, 34*b* pass laterally through the slot 106 and to locate the sprinkler 20 in or out of the void 104. Overall, each of the first and second members 102*a*, 102*b* define a geometric profile that facilitates sprinkler protection and handling of the assembly 10. Each of the first and second protective members 102*a*, 102*b* have a shielding segment 108 for shielding the thermally responsive trigger assembly 50 and/or other operational components of the sprinkler. In preferred embodiments of the device 100, each of the first and second protective members 102*a*, 102*b* respectively include a confronting segment 110*a*, 110*b* for confronting one of the sprinkler frame arms 34*a*, 34*b*. Moreover, the first and second confronting segments 110*a*, 110*b* are preferably disposed on opposite sides of the plane P1 and spaced apart from one another laterally about the device axis Y-Y to respectively confront the frame arms 34*a*, 34*b* so as to collectively form a preferred torque assist feature 120 of the device 100. As the torque assist feature 120, the confronting segments 110 preferably form a contact surface engagement with the pair of frame arms 34*a*, 34*b* to transfer to the sprinkler frame 30 a torque or rotational force applied to the device 100. Preferably, the confronting segments 110 cooperate to frictionally secure the sprinkler within the device 100 and simultaneously apply a torque to each arm. In preferred embodiments configurations of the torque assist feature 120, the device 100 is preferably asymmetrical with respect to the separating first plane P1, as seen in FIG. 2B. Moreover, given preferred geometrical configurations of the members 102*a*, 102*b* described herein, the device 100 is also preferably asymmetrical with respect to a second plane P2 extending perpendicular to the first plane P1 and intersecting at the device axis Y-Y.

The device 100 and its members 102*a*, 102*b* are preferably formed from a polymer or plastic material such as, for example, polyethylene and formed by molding such as, for example, injection molding. The device 100 can be either integrally formed or alternatively, components of the device 100 can be made and separately joined together. In preferred embodiments of the device 100, each of the protective members 102*a*, 102*b* defines a wall thickness that varies about the device axis Y-Y to define the preferred shielding segments 108, the confronting segments 110 of preferred torque assist feature 120 and/or other components of the device 100. Additionally, or alternatively, the wall thickness of the device 100 can vary in the axial direction. The wall thickness can range from 0.030 to 0.060 inch and more preferably range from 0.04 to 0.005 inch. However, the wall thickness of the device 100 could define a wall thickness smaller or greater than the range of 0.030 to 0.060 inch provided the device 100 provides for sufficient shielding for the sprinkler and the preferred torque assist feature 120 described herein.

The confronting segments 110 are preferably formed contiguously with the shielding segments 108 in each of the protective members 102*a*, 102*b*. With reference to the preferred embodiment shown in FIGS. 2C and 3C, the protective members 102*a*, 102*b* are shown with the confronting segments 110 having a greater wall thickness than the shielding segment 108. The confronting segments 110 extend inwardly toward the internal void 104 and the sprinkler 20 housed therein. Accordingly, the confronting segments 110 preferably include a first internal surface portion 111*a* which preferably extends parallel to the plane P1 for contact surface engagement with one of the frame arms and a second internal surface portion 111*b* that extends perpendicular to the first internal surface 111*a* and preferably contiguously between the first internal surface 111*a* and the shielding segment 108. In an alternate embodiment, the internal surfaces of the confronting segment 110 can be non-planar so long as they form a surface contact engagement with the frame arm to assist in transferring an applied torque to the sprinkler 20. As particularly shown in FIG. 3C, the confronting segment 110 extends axially and is preferably shorter in length than the shielding segment 108.

The shielding segment 108 in at least one, and preferably both, of the protective members 102*a*, 102*b* defines an arcuate or concave segment with respect to the central axes X-X, Y-Y in order to partially circumscribe and shield the thermally responsive trigger assembly 50. The concave segments 108 can defines a variable radius about the device axis Y-Y. The shielding portion of the members 102*a*, 102*b* can be defined by alternate geometries about the axis X-X provided the geometry can at least partially surround and shield the trigger assembly 50. Moreover, the geometries of the protective members 102*a*, 102*b* can vary from one another so as to define different curvatures and accommodate receipt and housing of the sprinkler 20 and its operative components.

To define the preferred lateral slots 106 of the device 100, the protective members 102*a*, 102*b* each define a lateral width and are spaced apart from one another about the plane P1. One preferred lateral slot 106*a* defines a width for receipt of the frame arms 34*a*, 34*b* and the preferred apex 34*c*. In preferred embodiments, the device 100 includes a second lateral slot 106*b* aligned with the first slot 106*a* along the plane P1. Together, the slots 106*a*, 106*b* preferably permit the protective members 102*a*, 102*b* to be flexibly drawn toward one another to narrow the lateral slots 106*a*, 106*b* and grip the sprinkler 20 therebetween for transfer of an applied torque. In preferred embodiments, the second slot 106*b* defines a width that is smaller than the receiving width of the first slot 106*a*. Each of the preferably opposed protective members 102*a*, 102*b* has a first lateral end 112*a* and a second lateral end 112*b* disposed laterally about the internal void 104 of the device 100 or the sprinkler 20 housed therein. In the preferred assembly 10, the confronting segments 110 form the preferred first lateral ends 112*a*. Accordingly, the first lateral ends 112*a* are preferably laterally spaced apart from one another at the maximum span between the frame arms 34*a*, 34*b*. Moreover, the second lateral ends 112*b* are preferably spaced apart from one another at the maximum span between the frame arms 34*a*, 34*b* so as to oppose a confronting segment 110 about the plane P1 with the frame arm therebetween. To accommodate the thermally responsive trigger 50 during installation of the frames 34*a*, 34*b* through the first lateral slot 106*a*, the first protective member 102*a* has a stepped profile 122 at its second lateral end 112*b* at the first lateral slot 106*a* and second protective member 102*b* has a linear profile at its first terminal end 112 at the first lateral slot 106*a*. The stepped profile 122, preferably, include a series of lateral segments 124*a*, 124*b* and transverse segments 126*a*, 126*b*.

The protective device 100 is located axially to extend from the frame body 32 to the fluid deflection member 40. Moreover, the confronting segments 110*a*, 110*b* are preferably located axially between the fluid outlet 33 and the apex 34*c*. In providing the preferred torque assist feature 120, the confronting segments 110*a*, 110*b* preferably contact the frame arms 34, 34*b* axially closer to the outlet 33 than to the apex 34*c*. Additionally, the protective device 100 is disposed about the frame 30 to expose the tool engagement surface or wrench boss of the sprinkler frame for use of the protective device 100 in combination with a wrench to install the sprinkler.

The protective device 100 preferably defines a first portion 100*a* for protection of the thermally responsive trigger assembly 50 and a second portion 100*b* for housing the fluid deflection member 40. Each of the first and second portions 100*a*, 100*b* of the protective device define a maximum width for housing the respective sprinkler components. The first and second members 102*a*, 102*b* extend axially and define a width or space therebetween and a lateral width about the device axis Y-Y to preferably form the first portion 100*a* of the device 100 for protecting the thermally responsive trigger 50. As shown, the maximum width of the second portion 100*b* is greater than the maximum width of the first portion 100*a*. Alternatively, the maximum width of the second portion 100*b* of the device 100 can be smaller than the first portion 100*a* where, for example, the fluid deflection member 40 is smaller than the maximum width between the frame arms 34*a*, 34*b*. Also as shown in the preferred embodiment of the device 100, the widths of the first portion 100*a* remain generally constant in the axial direction toward the second protection portion 100*b*. Alternatively, the first portion 100*a* of the device 100 can narrow in the axial direction either uniformly or in a step-wise fashion toward the second portion 100*b*.

The second protection portion 100*b* of the device preferably includes a first radially extending shielding surface 114*a* disposed normal or perpendicular to the device axis Y-Y to protect a surface of the fluid deflection member 40 opposed to the sprinkler outlet and a peripheral shielding surface that at least partially circumscribes the fluid deflection member. Moreover, the second portion 100*b* preferably includes a peripheral preferably circumferentially extending slot 106*c* formed in the peripheral surface and in fluid communication with the internal void 104 and the lateral axially extending slot 106*a* to laterally receive the fluid deflection member 40 when strapping the device 100 about the sprinkler 20. The radially extending surface 114*a* can extend internally within the device 100, as seen in FIG. 3C, to partially separate the first and second portions 100*a*, 100*b* of the device 100 provided the sprinkler 20 can be housed within the device 100 in a manner as described herein. Accordingly, the internal void 104 extends preferably contiguously through the first and second portions 100*a*, 100*b* of the device. The first radially extending surface 114*a* partially forms a radially extending slot or opening to provide the continuous internal void 104 between the first and second portions 100*a*, 100*b* of the device 100.

Figure 3A:
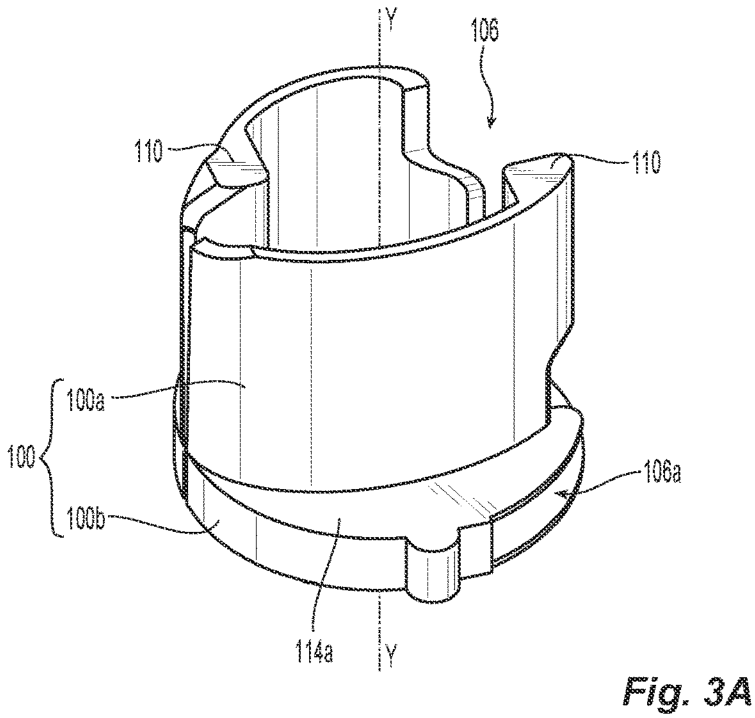
FIGS. 3A-3B are perspective views of the protective device used in the protected sprinkler assembly in FIG. 1A.
Figure 3B:
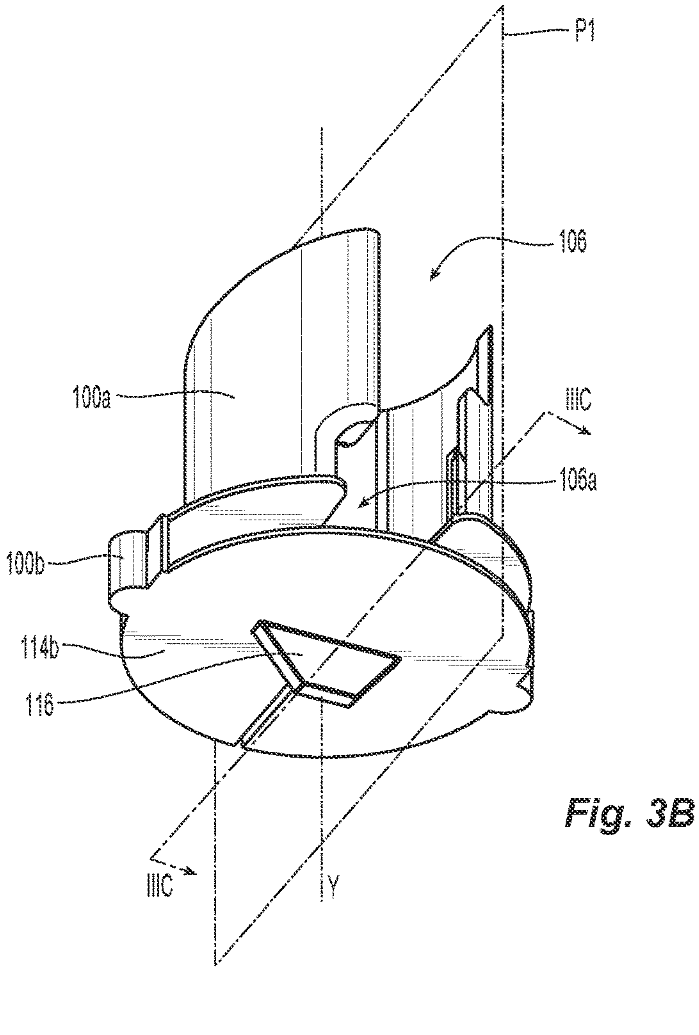
Figure 3C:
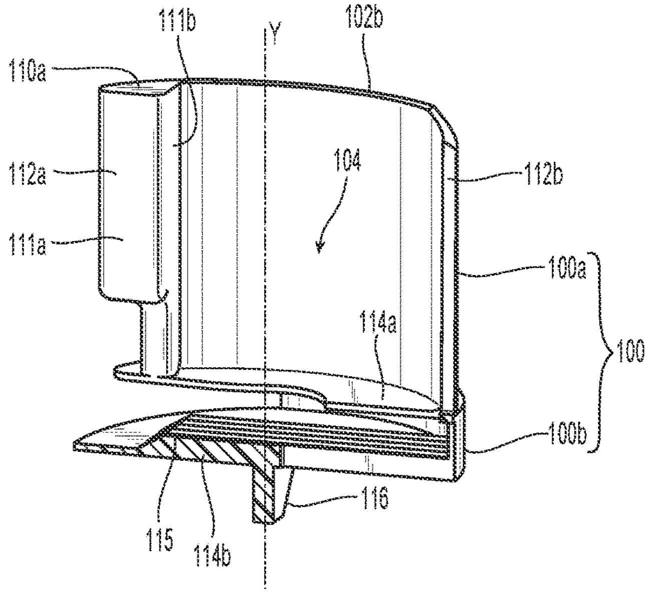
FIG. 3C is a cross-sectional perspective view of the protective device in FIG. 3A.

In the preferred embodiment shown in FIGS. 3B and 3C, the second protection portion 100*b* can include a second radially extending surface 114*b* parallel to the first radially extending surface 114*a* and normal to the central axis X-X to form a preferred lower surface for shielding the fluid deflection member 40. To secure the fluid deflection member 40 with the second portion 100*b* and the sprinkler 20 within the device 100, the second radially extending surface 114*b* can include one or more ribs or surface projections 115 that extend internally to form a preferred frictional engagement with the deflector member 40. Alternatively, or additionally, the internal surface projections 115 can be located along the first radially extending surface 114*a* or on the peripheral surface of the second portion 100*b* of the device. Additionally, the second surface 114*b* can include a tab member 116 that is preferably centrally located in line with the device axis and extends axially for gripping by hand to apply a hand torque to the protection assembly 10. Accordingly, preferred embodiments of the torque assist feature 120 includes a tab member 116 for applying a hand torque. In the preferred embodiment of the device 100 having a pair of lateral slots 106*a*, 106*b* separating the first and second protective members 102*a*, 102*b* of the first portion 100*a* of the device, the second radially extending surface 114*b* is preferably integrated with both members 102*a*, 102*b* so as to affix the protective members 102*a*, 102*b* to one another in the preferred spaced apart relationship about the plane P1.

Illustrated in FIG. 4 is the protected sprinkler assembly 10 being installed into the branch connector by hand. The preferred protective device 100 peripherally protects operative components of the sprinkler 20 including the trigger and the fluid deflection member. With a thumb exerted against confronting segment 110*a* of the first protective member 102*a* proximate the second lateral slot 106*b*, the remaining fingers can curl about the other protection member 102*b*. Accordingly, the device 100 can protect the operator's hand from the surface edges of the sprinkler 20. The torque assist feature 120 defined by the preferred confronting segments 110*a*, 110*b* contact frame arm(s) 34*a*, 34*b* to transfer the hand torque applied to the protective device 100 to the sprinkler 20 and torque the sprinkler 20 about its central axis X-X within the branch connector 200 to form a fluid tight sealed connection.

Referring again to FIGS. 1A and 1B, preferred embodiments of the protected sprinkler assembly are configured for hand installation into the branch connector 200 in a fluid tight connection. The branch connector 200 shown is generally a tubular member having a first inlet end 212 for connection to the pipe header 300 and a second outlet end 214 for a preferred threaded connection to the fluid distribution device 20. Depending upon the configuration of the fluid deflection member 40 of the sprinkler 20, the branch connector 200 can be arranged on the header 300 for appropriate installation as pendent, an upright or a sidewall/horizontal device. The branch connector 200 can be configured as a straight fitting or alternatively can be formed as a different type of fitting, such as for example, an elbow fitting or tee fitting to connect an appropriately configured sprinkler. Preferred embodiments of the branch connector 200 include an internal annular seal member for formation of a fluid tight sealed connection with the protected sprinkler assembly 20. The branch connector 200 includes a preferred internally formed gasket chamber in which an annular seal member 400 is disposed. Under load, the preferred geometry of gasket chamber in combination with the preferred geometry of the seal member 400 provides for radial outward deformation of the seal member 400 minimizing or eliminating interference with the flow of water through the annular seal member 400 to the sprinkler 20. The annular seal member 400 is preferably configured as the seal shown in U.S. Pat. No. 10,744,527 to provide a preferred leak-proof connection between a fire protection sprinkler or other fire protection device 20 and the branch connector 20. The material employed for seal member 400 is an EPDM material having a durometer hardness of from 65 to 80, and preferably 70, to provide the desired sealing function and maintain sprinkler position. Firefighting fluid fed into the inlet end 212 flows through the annular seal member out the outlet end 214 to supply the sprinkler 20 for discharge and distribution in accordance with the performance specification of the sprinkler 20.

The connector 200 includes an internally threaded portion proximate the outlet end 214 for coupling preferred embodiments of the protected fire protection sprinkler assembly 10 and more preferably coupling the protected sprinkler assembly 10 by hand torque using preferred embodiments of the protective device 100 described herein. The outlet end 214 and internally threaded portion is preferably configured for connection with a device 20 of a nominal size. Accordingly, preferred embodiments of the branch connector 200 at the outlet end 214 define a nominal size or diameter ranging from ½ inch to 1½ inch and more particularly any one of ½ inch, ¾ inch, 1 inch, 1¼ inch or 1½ inch. The outlet end 214 is preferably defined by a circular planar surface circumscribed and disposed orthogonally with respect to the central longitudinal axis X-X.

Generally, the external thread of the body 32 of the protected fire protection sprinkler 20 is of a tapered form, for example, NPT thread. The internal threaded portion of the branch connector 200 preferably includes an internal straight thread 22 for receipt of the tapered sprinkler thread of the sprinkler 20. The threaded engagement remains sealed from fluid supplied through the inlet end 212 by the proper fluid tight seal sealed engagements between the seal member 400, the branch connector 200 and the sprinkler 20. The internal diameter ID of the internal straight thread can be defined by any one of the pitch diameter, minor diameter or major diameter of the internal thread provided the straight thread engages the tapered thread of the sprinkler 200. The internal straight thread can be for example, a 1-11.5 NPSH Thread; a ¾-14 NPSH Thread; or a ½-14 NPS Thread for mating with a correspondingly nominal 1 inch, ¾ inch or ½ inch fire protection sprinkler.

Use of the preferred straight internal thread permits preferred embodiments of the protected sprinkler assembly 10 to be rotatable about the axis X-X within the branch connector 200, preferably by hand, in any desired position while forming a proper fluid tight seal. More preferably, the internal thread portion and the seal member 400 form a proper fluid tight seal engagement with the sprinkler 20 upon sufficient hand torque using preferred embodiments of the protective device 100. Threaded installation of the sprinkler 20 deforms the annular seal member 400 and provides a leak-proof fluid-tight seal between the sprinkler 20 and the branch connector 200. The connection between the branch connector 200 and the sprinkler 20 is sufficient to provide a fluid tight seal under a fluid pressure of up to 200 psi or more, for example, pressures of up to and including at least 175 psi.

The discharge or flow characteristics from the sprinkler body 32 is defined by the internal geometry of the sprinkler including its internal passageway, inlet and outlet (the orifice). Generally, the size of the sprinkler discharge orifice is defined by the nominal K-factor of a sprinkler. For a given sprinkler assembly, the larger the K-factor, the larger the discharge orifice, and the smaller the K-factor, the smaller the discharge orifice. Nominal K-factors for sprinklers listed in the National Fire Protection Association Standard Publication, *NFPA* 13*: Standard for the Installation of Sprinkler Systems*, can range from 1 to 30 [GPM/(psi.)$^{1/2}$] and greater. NFPA 13 identifies the following nominal K-factors of 14 or greater: 14[GPM/(psi.)$^{1/2}$] ("K14"); 16.8[GPM/(psi.)$^{1/2}$] ("K16.8"); 19.6[GPM/(psi.)$^{1/2}$]("K19.6"); 22.4[GPM/(psi.)$^{1/2}$] ("K22.4"); 25.2[GPM/(psi.)$^{1/2}$] ("K25.2") and 28.0 [GPM/(psi.)$^{1/2}$] ("K28"). Even larger nominal K-factors are also possible. As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway through the sprinkler body. Accordingly, the designed performance of a sprinkler is a function of the supply of a minimum fluid pressure or flow.

The length L of the branch connector 10 is preferably defined between the outlet end 214 and a mid-point of the concave portion of the saddle-shaped inlet 212. The overall length L of the branch connector between the inlet end 212 and the outlet end 214 preferably ranges from 1 inch to 1½ inch. Moreover, the overall length L of the branch connector 200 preferably corresponds or varies with the outlet nominal diameter size. For example, for a nominal outlet diameter of 1 inch, the length L is preferably 1¼ inch, where the nominal outlet diameter is ¾ inch, the length L is preferably 1⅛ inch and where the nominal outlet diameter is ½ inch, the length L is preferably 1 1/16 inch. The preferred sprinkler assembly 10 could be used with other known branch connectors shown and described, for example, in each of U.S. Pat. Nos. 8,297,663 and 10,744,527 and U.S. Patent Publication No. 2019/0175968.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A protected fire protection sprinkler assembly comprising:

- a fire protection sprinkler including:
  - a frame having a body having an inlet, an outlet, an internal passageway extending between the inlet and the outlet along a central sprinkler axis, and an external thread formed about the central sprinkler axis, the frame including a pair of spaced apart frame arms disposed in a plane and extending axially from the body;
  - a fluid deflection member affixed to the frame arms and centered along the central sprinkler axis; and
  - a thermally responsive trigger assembly aligned along the central sprinkler axis; and
- a protective device disposed about the fire protection sprinkler, the protective device including:
  - a first protective member and a second protective member opposed one another about the plane to define a void therebetween for housing at least a part of the sprinkler therein, the opposed first and second protective members defining at least one lateral slot aligned with the plane extending parallel to the plane for passing the frame arms laterally therethrough in and out of the void, each of the first and second protective members consisting of a single confronting segment for confronting one frame arm and a shielding segment for shielding the thermally responsive trigger, the confronting segment of the first protective member and the confronting segment of the second protective member being on opposite sides of the plane and confronting different frame arms so as to collectively form a torque assist feature of the device in contact surface engagement with the pair of frame arms therebetween for transferring a torque to the frame of the sprinkler.

2. The assembly of claim 1, wherein each confronting segment includes an internal surface of the protective member with respect to the void, the internal surface including a first surface portion extending perpendicular to the plane and a second surface portion extending perpendicular to the first surface portion.

3. The assembly of claim 2, wherein the shielding segment of each of the first and second protective members is contiguous with the confronting segment, the shielding segment being an arcuate segment about the thermally responsive trigger assembly.

4. The assembly of claim 3, wherein the thermally responsive trigger comprises a solder link with a strut and lever assembly.

5. The assembly of claim 3, wherein the protective device is asymmetrical with respect to the plane and asymmetrical with respect to a second plane perpendicular to the first plane.

6. The assembly of claim 4, wherein the arcuate shielding segments of the first and second protective members defining different curvatures.

7. The assembly of claim 4, wherein the protective device includes a first portion for shielding the thermally responsive trigger assembly and a second portion for shielding the fluid deflection member with the internal void extending contiguously through the first and second portions, the second portion including a peripheral circumferentially extending slot in fluid communication with the internal void and the lateral slot to receive the fluid deflection member.

8. The assembly of claim 7, wherein the first portion of the protective device is located axially between the sprinkler body and the fluid deflection member so as to expose a tool engagement surface of the frame body.

9. The assembly of claim 7, wherein each of the first and second portions of the protective device define a maximum width, the maximum width of the second portion being greater than the maximum width of the first portion.

10. The assembly of claim 7, wherein the torque assist feature includes a tab member axially extending from the second portion of the protective device and centered along the device axis for applying a torque to the protective device.

11. The assembly of claim 1, wherein the second protective member includes the second confronting segment about the at least one lateral slot, and wherein the first protective member includes a lateral end disposed opposite the first confronting segment and about the at least one lateral slot, the lateral end including a stepped profile having a series of lateral segments and transverse segments.

12. A method of protecting and installing a fire protection sprinkler having a frame with a body and a pair of frame arms extending from the body and spaced apart from one another in a plane, a fluid deflection member coupled to the frame arms and spaced from the body with a thermally responsive trigger assembly coaxially disposed between the body and the fluid deflection member along a central sprinkler axis, the method comprising:

- laterally receiving the fire protection sprinkler within an internal void of a protective installation device defined by a first protective member and a second protective member of the device, wherein the first protective member includes a torque assist feature consisting of a first confronting segment and the second protective member includes a torque assist feature consisting of a second confronting segment;
- drawing the first protective member and the second protective member toward one another to grip the frame arms of the fire protection sprinkler with the first confronting segment of the first protective member and the second confronting segment of the second protective member; and
- simultaneously applying a torque to each frame arm with the first confronting segment of the first protective member confronting one frame arm from one side of the plane and the second confronting segment of the second protective member confronting another frame arm from an opposite side of the plane.

13. The method of claim 12, further comprising applying a hand torque to the protective installation device at a tab member extending axially from a surface shielding the fluid deflection member and disposed perpendicular to a central axis of the device.

14. The method of claim 12, wherein the simultaneously applying the torque includes gripping the sprinkler by drawing the protective members toward one another and narrowing a pair of lateral slots axially extending between the first and second protective members.

15. A protective installation device for a fire protection sprinkler, the device comprising:

a first member and a second member opposed and spaced about a plane to define an internal void having a device axis and a first lateral slot and second lateral slot aligned along the plane and in communication with the void; and a torque assist feature including a first confronting segment of the first member and a second confronting segment of the second member, the first and second confronting segments being disposed on opposite sides of the plane and spaced apart laterally about the device axis, each of the first and second confronting segments defining an internal surface with respect to the void to form a contact surface engagement with one arm in a pair of frame arms of the fire protection sprinkler, wherein a first lateral end of the first member is disposed proximate the first lateral slot, and the first lateral end includes the first confronting segment, and wherein a second lateral end of the first member is disposed proximate the second lateral slot, and the second lateral end comprises a stepped profile having a series of lateral segments and transverse segments.

16. The device of claim 15, wherein each confronting segment includes a first surface portion extending perpendicular to the plane and a second surface portion extending perpendicular to and contiguous with the first surface portion.

17. The device of claim 16, wherein each of the first and second members includes a shielding segment contiguous with the confronting segment, the shielding segment being an arcuate segment, the arcuate shielding segments of the first and second members defining different curvatures about the void.

18. The device of claim 17, wherein the protective device is asymmetrical with respect to the plane between the members and asymmetrical with respect to another plane perpendicular to the plane between the members.

19. The device of claim 15, wherein the first and second members define a first portion of the device for protection of a trigger assembly of the sprinkler, the protective device including a second portion for shielding a fluid deflection member of the sprinkler, the second portion including a peripheral circumferentially extending slot in fluid communication with the internal void and the lateral slot to receive the fluid deflection member.

20. The device of claim 19, wherein each of the first and second portions of the protective device define a maximum width, the maximum width of the second portion being greater than the maximum width of the first portion.

21. The device of claim 19, wherein the torque assist feature includes a tab member axially extending from the second portion of the second device and centered along the device axis for applying a torque to the protective device.

* * * * *